(12) United States Patent
Abdellatif et al.

(10) Patent No.: US 11,584,158 B2
(45) Date of Patent: Feb. 21, 2023

(54) MAGNETIC CRAWLER WITH 3 ARTICULATED WHEELS FOR NAVIGATION ON PIPES

(71) Applicants: Saudi Arabian Oil Company, Dhahran (SA); KING ABDULLAH UNIVERSITY OF SCIENCE AND TECHNOLOGY, Thuwal (SA)

(72) Inventors: Fadl Abdellatif, Thuwal (SA); Hesham A. Jifri, Thuwal (SA); Sahejad Patel, Thuwal (SA); Amjad Felemban, Thuwal (SA); Jeff S. Shamma, Thuwal (SA)

(73) Assignees: Saudi Arabian Oil Company, Dhahran (SA); King Abdullah University Of Science And Technology, Thuwal (SA)

( * ) Notice: Subject to any disclaimer, the term of this patent is extended or adjusted under 35 U.S.C. 154(b) by 212 days.

(21) Appl. No.: 17/107,768

(22) Filed: Nov. 30, 2020

(65) Prior Publication Data
US 2022/0169072 A1  Jun. 2, 2022

(51) Int. Cl.
  *B60B 19/00* (2006.01)
  *G01N 29/22* (2006.01)
  *F16L 9/02* (2006.01)

(52) U.S. Cl.
  CPC ......... *B60B 19/006* (2013.01); *G01N 29/225* (2013.01); *B60Y 2200/60* (2013.01); *F16L 9/02* (2013.01)

(58) Field of Classification Search
  CPC . B60B 19/006; B60B 19/12; B60B 2900/931; B60Y 2200/60; B62D 61/065; F16L 9/02; F17D 5/00; G01N 29/225
  See application file for complete search history.

(56) References Cited

U.S. PATENT DOCUMENTS

| 4,995,320 A | 2/1991 | Sato et al. |
| 6,317,387 B1 | 11/2001 | D'Amaddio et al. |

(Continued)

FOREIGN PATENT DOCUMENTS

| CN | 204775574 U | 11/2015 |
| CN | 106240665 A | 12/2016 |

(Continued)

OTHER PUBLICATIONS

Santos et al, Scheduled Fuzzy Controllers For Omnidirectional Motion Of An Autonomous Inspection Robot With Four Fully Steerable Magnetic Wheels, 2016 XIII Latin American Robotics Symposium and IV Brazilian Robotics Symposium (Year: 2016).*

(Continued)

*Primary Examiner* — David L Singer
(74) *Attorney, Agent, or Firm* — Leason Ellis LLP

(57) ABSTRACT

A magnetic crawler configured to navigate on and inspect a ferromagnetic cylindrical surface is provided. The crawler includes a chassis, a controller configured to control the crawler, a probe configured to inspect the cylindrical surface under the control of the controller, and only three articulated magnetic wheels configured to tangentially contact and magnetically adhere to the cylindrical surface. The wheels include two drive wheels respectively coupled to the chassis by two articulation joints and configured to drive the crawler in a desired direction on the cylindrical surface by actively rotating the two drive wheels independently about respective drive axes of rotation by respective drive motors under the control of the controller; and a rear wheel coupled to the chassis by a rear articulation joint and configured to passively rotate about a rear drive axis of rotation in response to the active rotations of the two drive wheels.

20 Claims, 12 Drawing Sheets

(56) References Cited

U.S. PATENT DOCUMENTS

| | | |
|---|---|---|
| 9,863,891 B1 | 1/2018 | Lara Magallanes et al. |
| 2015/0158565 A1 | 6/2015 | Noordstrand et al. |
| 2019/0017656 A1* | 1/2019 | Carrasco Zanini .... B62D 53/02 |
| 2019/0152544 A1 | 5/2019 | Outa |
| 2020/0018446 A1 | 1/2020 | Carrasco Zanini et al. |
| 2020/0041074 A1 | 2/2020 | Zanini et al. |

FOREIGN PATENT DOCUMENTS

| | | | | |
|---|---|---|---|---|
| CN | 108082320 A | * | 5/2018 | ........... B62D 57/024 |
| JP | S62268782 A | | 11/1987 | |

OTHER PUBLICATIONS

International Search Report and Written Opinion in corresponding PCT Application No. PCT/US2021/061150 dated Mar. 14, 2022; 13 pages.

Cook, Brendan. (2017) "DT640 MAG/VAC Crawlers" PDF file, https://spectisrabotics.com/wp/wp-content/uploads/2020/08/SpectisRobotics-DT640MAG-VAC.pdf. 2 pages.

* cited by examiner

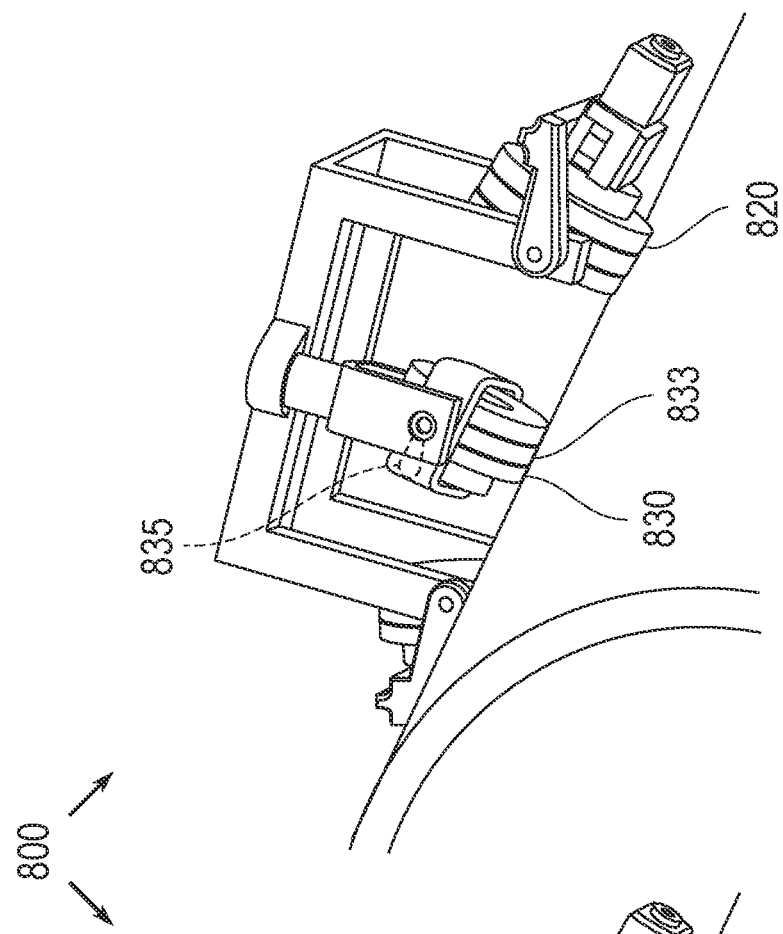
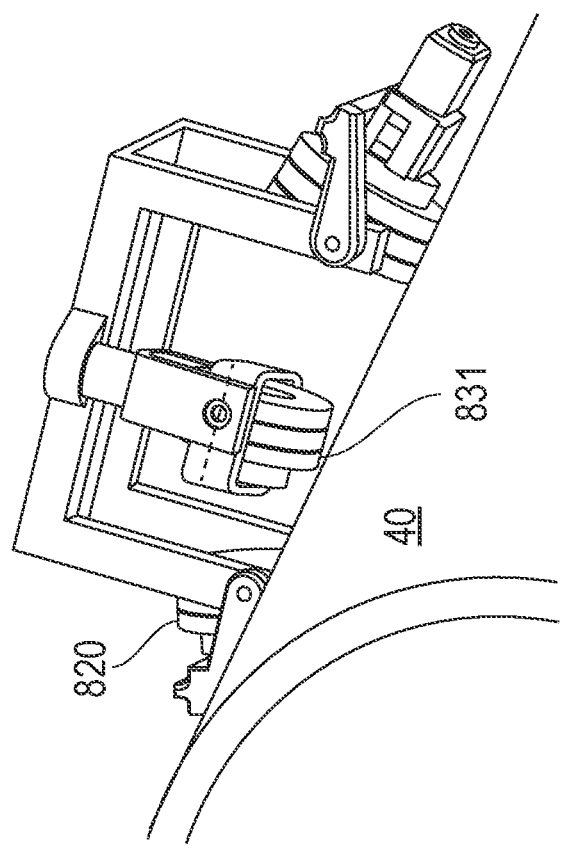
FIG. 8B
FIG. 8A

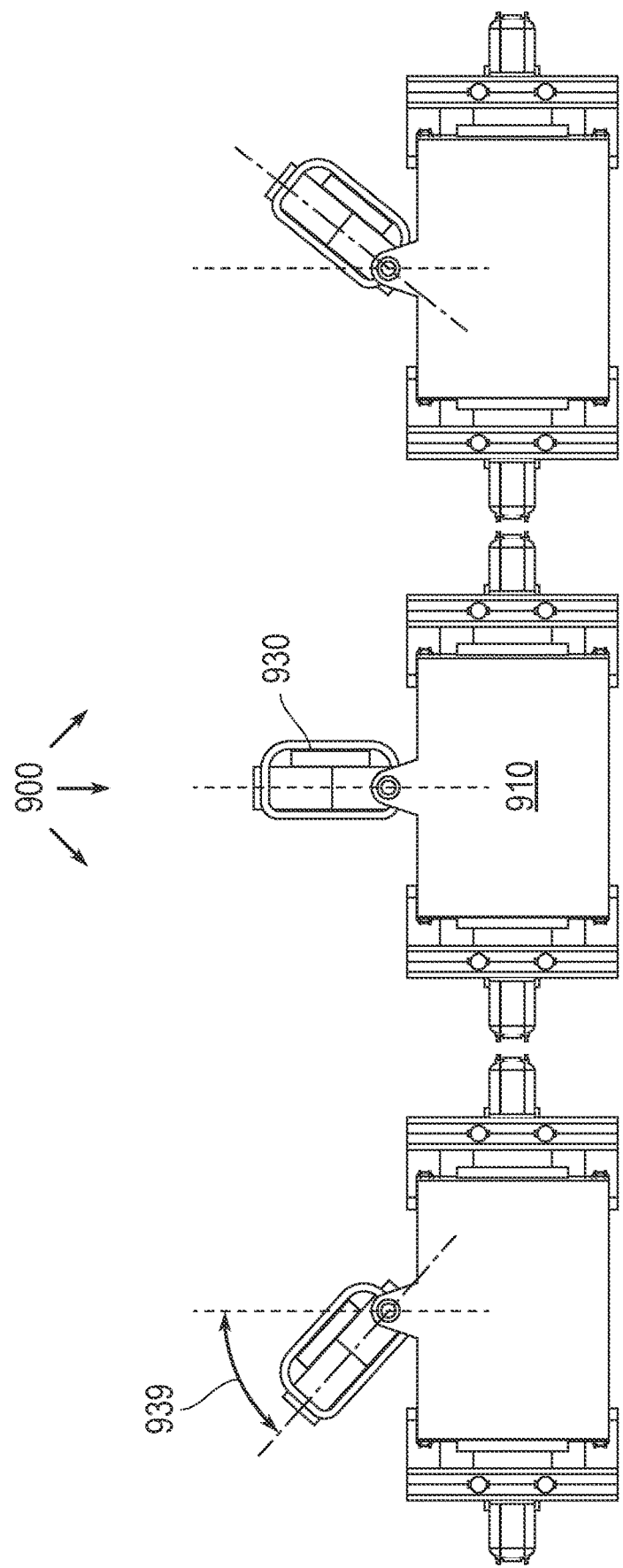

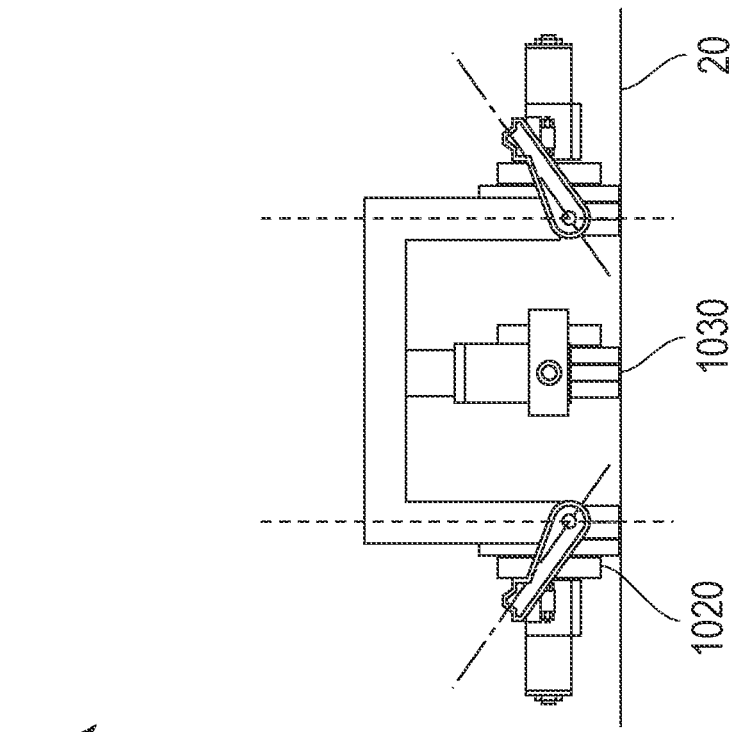
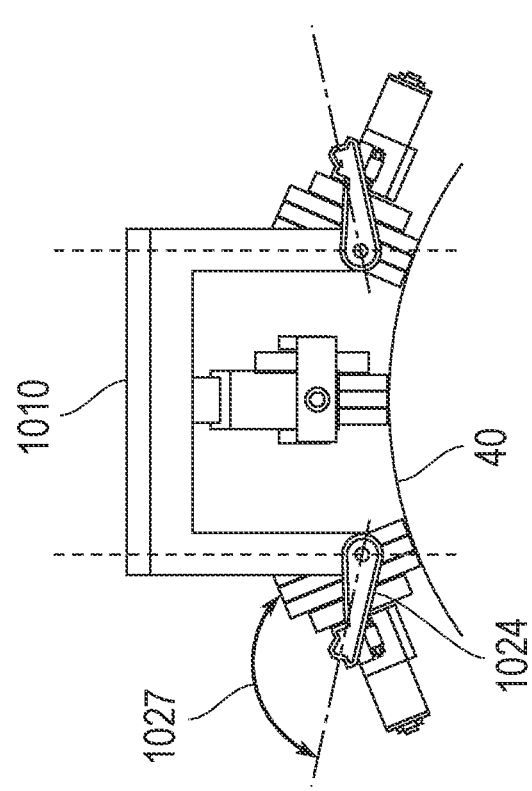
FIG. 10A
FIG. 10B

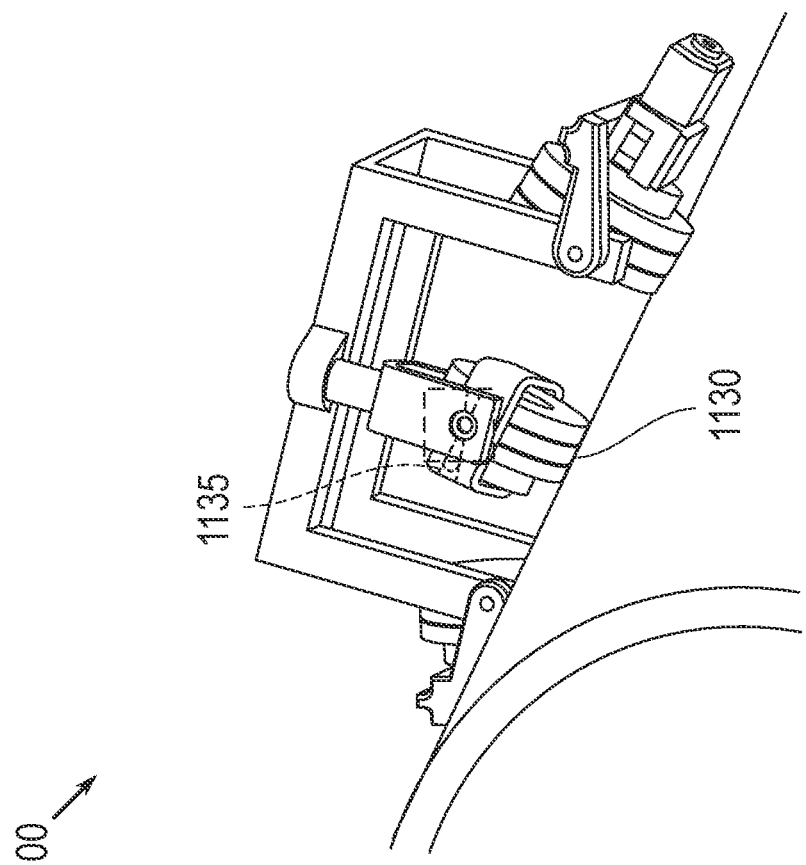
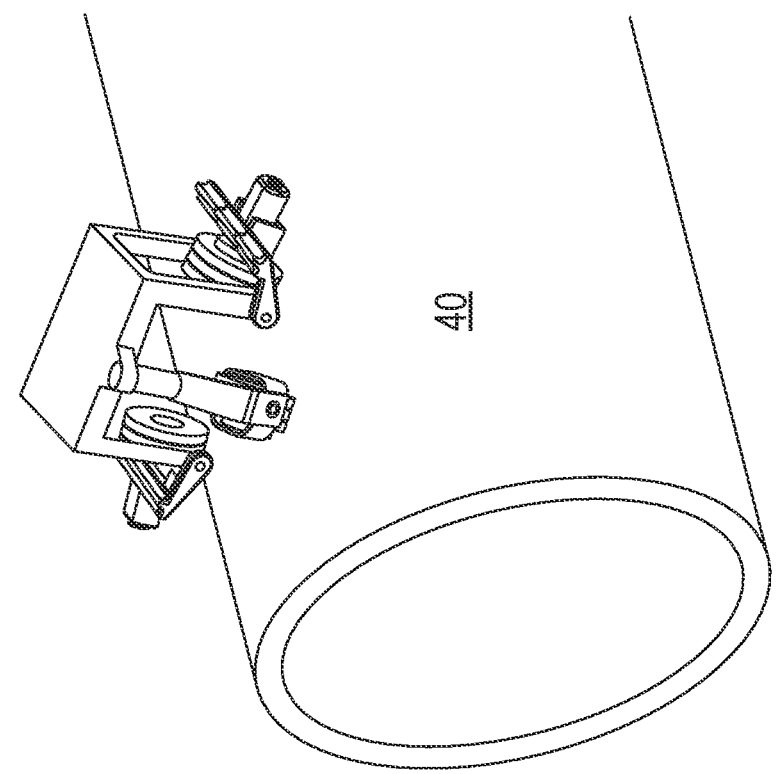
FIG. 11A
FIG. 11B

MAGNETIC CRAWLER WITH 3 ARTICULATED WHEELS FOR NAVIGATION ON PIPES

FIELD OF THE DISCLOSURE

The present disclosure relates generally to a magnetic crawler having only three articulated wheels and that is capable of navigating and inspecting ferromagnetic pipes and other curved surfaces.

BACKGROUND OF THE DISCLOSURE

One of the top challenges in the oil and gas industry is the periodic inspection of elevated assets found in refineries, gas plants, offshore platforms, and other plants and facilities. These assets include high-elevation pipes and structures that are difficult to access during inspection jobs. Often, the only practical way to inspect them is to erect scaffolding in order for the inspector to access the asset and perform manual inspection. Such scaffolding is not only expensive and introduces a significant cost barrier for frequent inspection, but also poses safety concerns mainly in the form of falling and tripping hazards.

It is in regard to these and other problems in the art that the present disclosure is directed to provide a technical solution for an effective magnetic crawler having only three articulated magnetic wheels for navigation on and inspection of ferromagnetic curved surfaces.

SUMMARY OF THE DISCLOSURE

According to a first aspect of the disclosure, a magnetic crawler configured to navigate on and inspect a ferromagnetic cylindrical surface is provided. The magnetic crawler comprises: a chassis; a controller coupled to the chassis and configured to control the magnetic crawler; a probe coupled to the chassis and configured to inspect the ferromagnetic cylindrical surface under the control of the controller; and only three articulated magnetic wheels coupled to the chassis and configured to tangentially contact and magnetically adhere to the cylindrical surface. The three magnetic wheels comprise: right and left drive wheels respectively coupled to the chassis by right and left articulation joints and configured to drive the magnetic crawler in a desired direction on the cylindrical surface by actively rotating independently about respective right and left drive axes of rotation using respective right and left drive motors under the control of the controller; and a rear wheel coupled to the chassis by a rear articulation joint and configured to passively rotate about a rear drive axis of rotation in response to the active rotations of the right and left drive wheels. The right and left articulation joints respectively provide single degree of freedom rotation of the right and left drive wheels with respect to the chassis about respective right and left tilt axes of rotation in order to tilt the right and left drive wheels with respect to the chassis and maintain the tangential contact with the curvature of the cylindrical surface. The rear articulation joint provides two degrees of freedom rotation of the rear wheel with respect to the chassis about a rear tilt axis of rotation and a swivel axis of rotation perpendicular to the rear tilt axis of rotation, the rear tilt axis of rotation being to tilt the rear wheel with respect to the chassis and maintain the tangential contact with the curvature of the cylindrical surface, and the swivel axis of rotation being to swivel the rear wheel with respect to the chassis in the desired direction in response to the driving of the magnetic crawler.

In an embodiment consistent with the above, the right and left drive wheels are further configured to actively rotate independently about their respective right and left drive axes of rotation in either forward or reverse directions using their respective right and left drive motors under the control of the controller.

In an embodiment consistent with the above, the magnetic crawler further comprises angle measuring sensors coupled to the chassis and configured to measure respective angles of the tilts of the three magnetic wheels with respect to the chassis and to measure an angle of the swivel of the rear wheel with respect to the chassis under the control of the controller.

In an embodiment consistent with the above, the controller is further configured to maintain the magnetic crawler on a desired trajectory on the cylindrical surface by controlling the driving of the right and left drive wheels using the measured angles.

In an embodiment consistent with the above, the desired trajectory is a helical path having a desired helix pitch of the cylindrical surface.

In an embodiment consistent with the above, the probe comprises an ultrasonic testing (UT) sensor configured to nondestructively measure a thickness of the cylindrical surface under the control of the controller, and the controller is further configured to perform a two-dimensional mapping of the surface thickness across the whole cylindrical surface by controlling the UT sensor to measure the surface thickness while controlling the driving of the right and left drive wheels along the helical path.

In an embodiment consistent with the above, the controller is further configured to estimate a pose of the magnetic crawler with respect to the cylindrical surface using the measured angles and a geometry of the magnetic crawler.

In an embodiment consistent with the above, the rear articulation joint is configured to provide the rear wheel 360° of rotation about the rear swivel axis of rotation.

In an embodiment consistent with the above, the probe comprises an ultrasonic testing (UT) sensor configured to nondestructively measure a thickness of the cylindrical surface under the control of the controller.

In an embodiment consistent with the above, the cylindrical surface is part of a carbon steel pipe or vessel.

According to another aspect of the disclosure, an automated method of navigating on and inspecting a ferromagnetic cylindrical surface using a magnetic crawler is provided. The magnetic crawler comprises a chassis, a controller coupled to the chassis, a probe coupled to the chassis, and only three articulated magnetic wheels coupled to the chassis. The three magnetic wheels comprises right and left drive wheels respectively coupled to the chassis by right and left articulation joints, and a rear wheel coupled to the chassis by a rear articulation joint. The method comprises: inspecting the ferromagnetic cylindrical surface by the probe as controlled by the controller; tangentially contacting and magnetically adhering to the cylindrical surface by the three articulated magnetic wheels; driving the magnetic crawler in a desired direction on the cylindrical surface by actively rotating the right and left drive wheels independently about respective right and left drive axes of rotation using respective right and left drive motors as controlled by the controller; passively rotating the rear wheel about a rear drive axis of rotation in response to the active rotations of the right and left drive wheels; tilting the right and left drive wheels with respect to the chassis while maintaining their tangential contact with the curvature of the cylindrical surface using the respective right and left articulation joints to respectively provide single degree of freedom rotation of the right and left drive wheels with respect to the chassis about respective right and left tilt axes of rotation; and tilting the rear wheel with respect to the chassis while maintaining the tangential contact with the curvature of the cylindrical surface and swiveling the rear wheel with respect to the chassis in the desired direction in response to the driving of the magnetic crawler using the rear articulation joint to provide two degrees of freedom rotation of the rear wheel with respect to the chassis about a rear tilt axis of rotation and a swivel axis of rotation perpendicular to the rear tilt axis of rotation.

In an embodiment consistent with the method described above, actively rotating the right and left drive wheels comprises actively rotating the right and left drive wheels independently about their respective right and left drive axes of rotation in either forward or reverse directions using their respective right and left drive motors as controlled by the controller.

In an embodiment consistent with the method described above, the magnetic crawler further comprises angle measuring sensors coupled to the chassis, and the method further comprises using the angle measuring sensors as controlled by the controller to measure respective angles of the tilts of the three magnetic wheels with respect to the chassis, and to measure an angle of the swivel of the rear wheel with respect to the chassis.

In an embodiment consistent with the method described above, the method further comprises maintaining, by the controller, the magnetic crawler on a desired trajectory on the cylindrical surface by controlling the driving of the right and left drive wheels using the measured angles.

In an embodiment consistent with the method described above, the desired trajectory is a helical path having a desired helix pitch of the cylindrical surface.

In an embodiment consistent with the method described above, the probe comprises an ultrasonic testing (UT) sensor, and the method further comprises nondestructively measuring a thickness of the cylindrical surface using the UT sensor as controlled by the controller, and performing, by the controller, a two-dimensional mapping of the surface thickness across the whole cylindrical surface by controlling the UT sensor to measure the surface thickness while controlling the driving of the right and left drive wheels along the helical path.

In an embodiment consistent with the method described above, the method further comprises estimating, by the controller, a pose of the magnetic crawler with respect to the cylindrical surface using the measured angles and a geometry of the magnetic crawler.

In an embodiment consistent with the method described above, the method further comprises providing the rear wheel, by the rear articulation joint, 360° of rotation about the rear swivel axis of rotation.

In an embodiment consistent with the method described above, the probe comprises an ultrasonic testing (UT) sensor, and the method further comprises nondestructively measuring a thickness of the cylindrical surface using the UT sensor as controlled by the controller.

In an embodiment consistent with the method described above, the cylindrical surface is part of a carbon steel pipe or vessel.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIGS. 8A-8B are rear views of an example magnetic crawler having only three articulated magnetic wheels navigating on a pipe, respectively illustrating the rear wheel prior to and after making tangential contact with the pipe surface, according to an embodiment.

FIGS. 9A-9C are top views of an example magnetic crawler having only three articulated magnetic wheels, illustrating example angle measurements of the swivel of the rear wheel with respect to the crawler chassis compared to a centered orientation, with the swivel of the rear wheel being to the left, centered, and to the right, respectively, according to an embodiment.

FIGS. 10A-10B are front views of an example magnetic crawler having only three articulated magnetic wheels, illustrating example angle measurements of the tilt of the right and left drive wheels with respect to the crawler chassis on curved and flat surfaces, respectively, compared to a reference direction, according to an embodiment.

FIG. 11A illustrates an example magnetic crawler having only three articulated magnetic wheels navigating a helical path on a pipe, according to an embodiment.

FIG. 11B is an enlarged rear view of the magnetic crawler of FIG. 11A, illustrating the passive adjustment of the rear wheel in the tilt direction to track the curved surface of the pipe on the helical path.

DETAILED DESCRIPTION OF CERTAIN EMBODIMENTS OF THE DISCLOSURE

Figure 1:
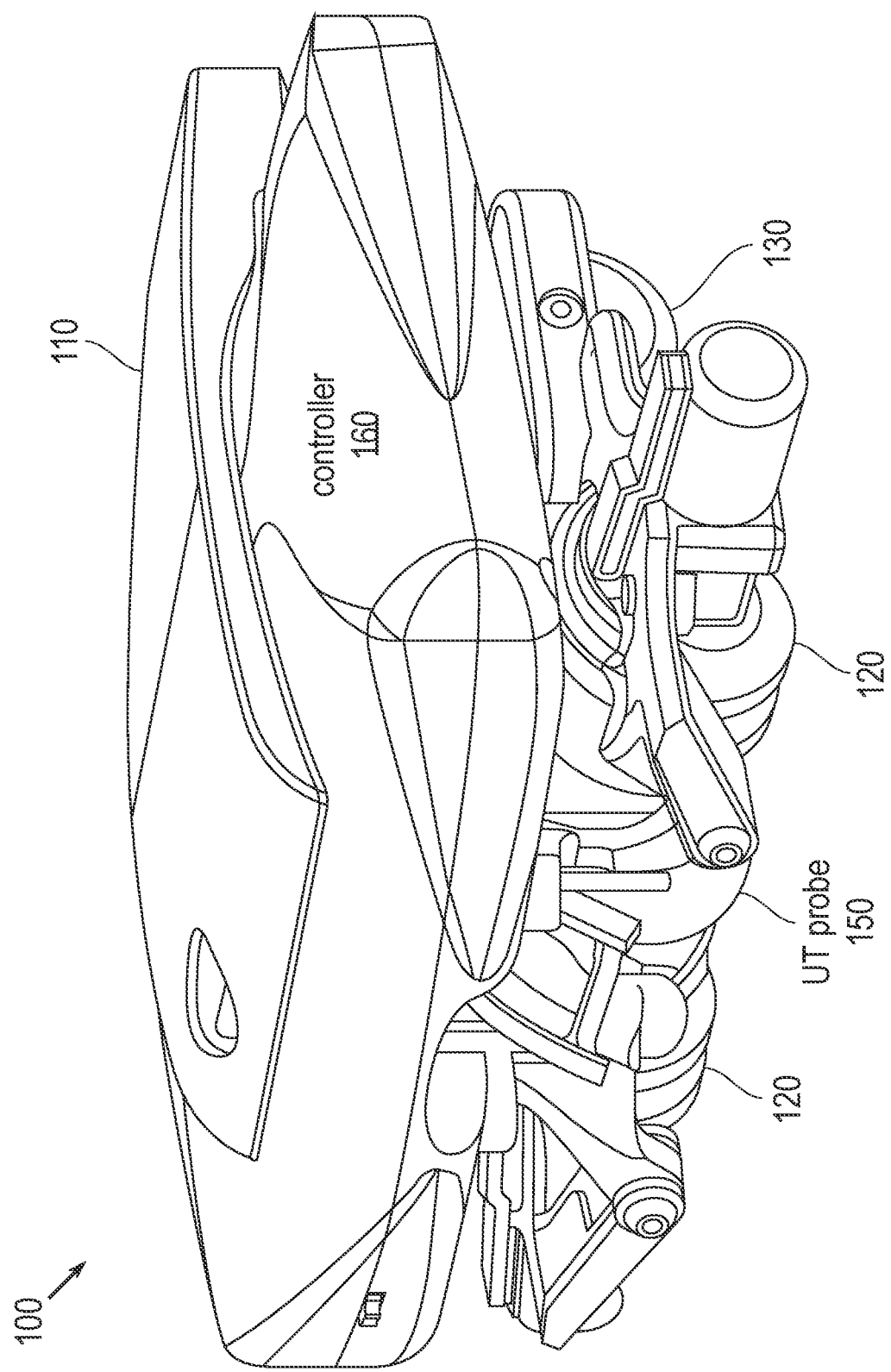
FIG. 1 illustrates an example magnetic crawler having only three articulated magnetic wheels and that navigates on a ferromagnetic cylindrical surface while inspecting the cylindrical surface, according to an embodiment.

Example embodiments of the present disclosure are directed to a three-wheel magnetic crawler that can drive on curved surfaces such as pipes, vessels, and storage tanks as well as on flat surfaces. In some such embodiments, when deployed on a pipe, the crawler is capable of driving longitudinally along the length of the pipe (parallel to the pipe's axis), circumferentially around the pipe, or a combination of the two, such as helically about the pipe. Moreover, in some such embodiments, the crawler maneuvers freely and turns in place for a smooth roaming motion on the pipe. In some such embodiments, the crawler automatically accommodates and adjusts to multiple curvatures (e.g., radii of curvature) and pipe diameters passively and without any modifications to or on the vehicle chassis of the crawler. In some embodiments, the crawler includes or holds inspection sensors, such as an Ultrasonic Testing (UT) sensor, which is an inspection technique in the oil and gas industry. In some embodiments, UT sensors are used as a non-destructive testing technique for inspection of steel surfaces. In some such embodiments, because of effects over time such as corrosion, UT sensors are used to periodically measure the thickness of steel to make sure the steel thickness does not fall below a certain (such as a predetermined) critical limit to, for example, avoid leaks, failures, and unplanned shutdowns. In example embodiments, the three-wheel crawler design enables UT measurement recording over entire surfaces because of the crawler's robust maneuverability on ferromagnetic pipes.

As discussed earlier, one of the top challenges in the oil and gas industry is the periodic inspection of elevated assets found in refineries, gas plants, offshore platforms, and other plants and facilities. These assets include high-elevation pipes and structures that are difficult to access during inspection jobs. Even automated, mechanical, or robotic techniques face challenges accessing these surfaces, much of which are curved, sideways, and upside down (with reference to gravity).

It is in regard to these and other problems that embodiments of the present disclosure are directed to effective techniques that allow robotic systems to perform inspection (e.g., sensing, measuring) on these assets in a cost-effective way. In some embodiments, a crawler having a chassis and (only) three magnetic wheels attached to the crawler chassis is provided. In some such embodiments, the configuration includes two motorized (or active) magnetic wheels (e.g., right and left drive wheels) that act as front driving wheels, and a passive rear wheel (e.g., a caster wheel). In some such embodiments, the crawler also includes a UT probe for performing UT thickness measurements of the ferromagnetic curved surface (such as a cylindrically-shaped surface as in a carbon steel pipe). In some such embodiments, the crawler maneuvers freely on flat surfaces, vessels, tanks (e.g., storage tanks), and pipes with various diameters and is capable of taking sensor measurements while doing so. There are numerous variations of the magnetic crawler having only three articulated magnetic wheels, example embodiments of which are illustrated in FIGS. 1-11B and described in the text that follows.

FIG. 1 illustrates an example magnetic crawler 100 having only three articulated magnetic wheels and that navigates on a ferromagnetic cylindrical surface while inspecting the cylindrical surface, according to an embodiment. The magnetic crawler 100 includes a crawler chassis 110, which is coupled to (or holds or contains or otherwise integrates) components such as front driving wheels 120 (e.g., right and left drive wheels), a rear caster wheel 130, a UT probe 150, and a controller 160. The front driving wheels 120 and the rear caster wheel 130 are articulated in the tilt direction, such that they tilt to match the curvature of (e.g., make tangential contact with) the curved surface (such as a pipe) on which they are deployed. In addition, the rear caster wheel 130 is articulated in the swivel direction, such that it pivots to follow the direction of travel of the crawler chassis 110. During this navigation on the curved ferromagnetic surface, the UT probe 150 performs UT thickness measurements in order to build a two-dimensional thickness profile (e.g., a C-scan) of the entire cylindrical surface from the UT thickness measurements obtained while navigating the entire cylindrical surface.

Here, "entire" means to a certain degree of density, such as one thickness measurement every square inch. The pattern of measurement locations can be, for example, entirely uniform (such as one measurement every inch in longitudinal and circumferential directions), or uniformly distributed (such as by helical paths of a particular helical pitch to cover the entire cylindrical surface to the desired density), or other such dense distribution of measurement points.

In addition, the operations of the magnetic crawler 100 are controlled by the controller 160, which can be a processor or logic circuit configured (e.g., by code or logic design) to carry out the control of the operations. For example, in some embodiments, the controller 160 is a microprocessor configured by code to control the driving of the front driving wheels 120 to maneuver the crawler 100 in the desired direction or path on the curved ferromagnetic surface. In some such embodiments, the controller 160 controls the operation of the UT probe 150, such as when the UT probe 150 takes a thickness measurement of the cylindrical surface.

Figure 2:
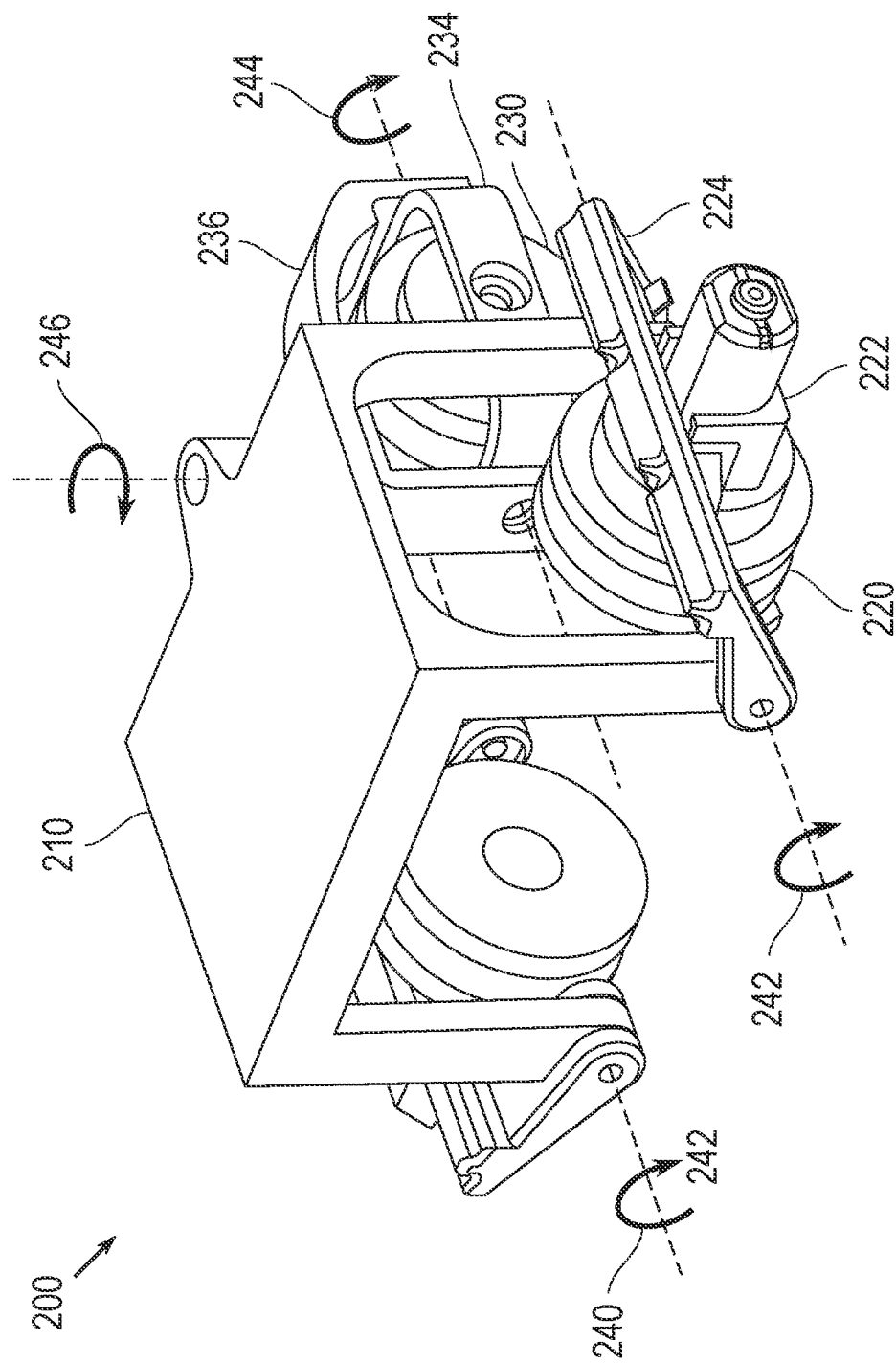
FIG. 2 is a cutaway view of an example magnetic crawler having only three articulated magnetic wheels for navigating a curved ferromagnetic surface (such as a carbon steel pipe), according to an embodiment.
Figure 3:
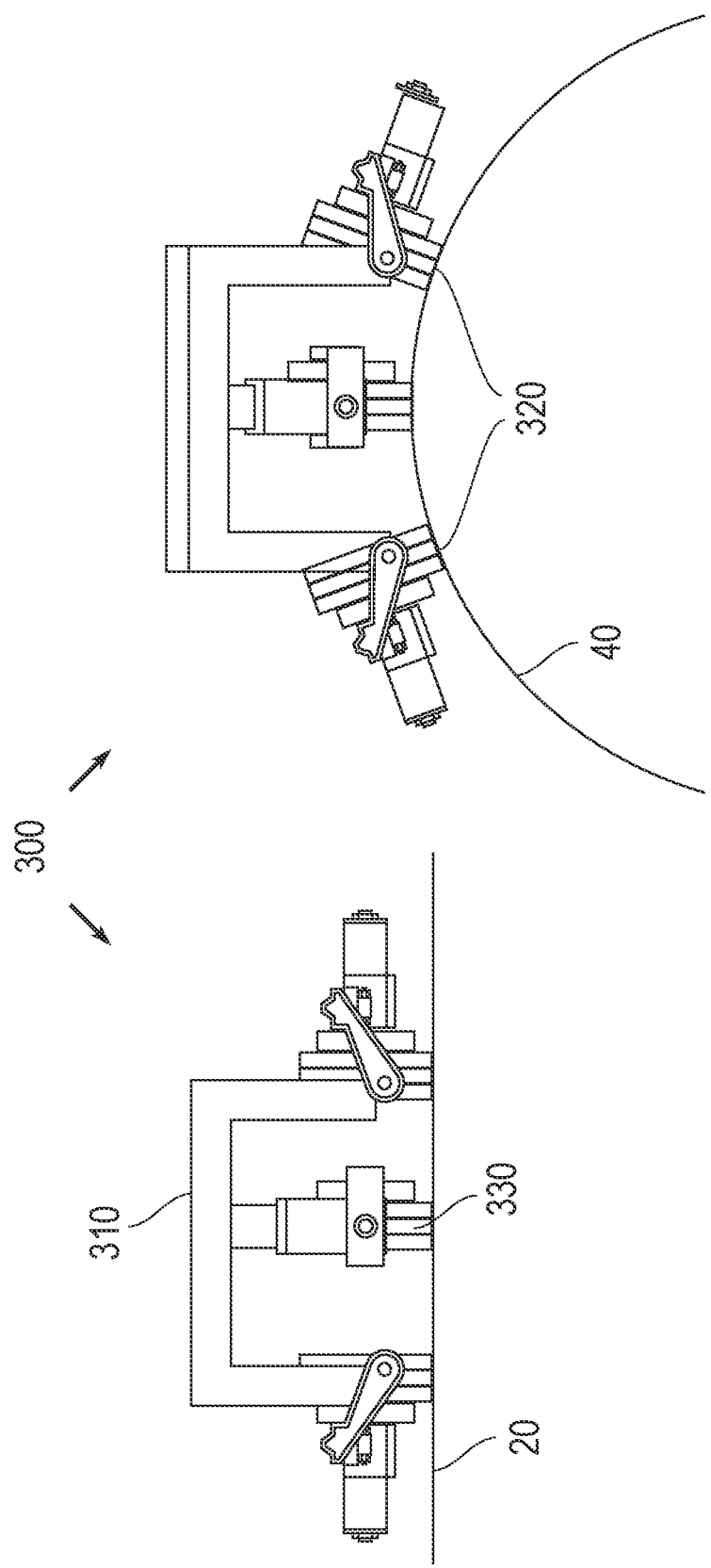
FIGS. 3A-3B are front views of an example magnetic crawler having only three articulated magnetic wheels navigating flat and curved surfaces, respectively, and illustrating a rotational degree of freedom for the right and left drive wheels in the tilt direction, according to an embodiment.
Figure 4:
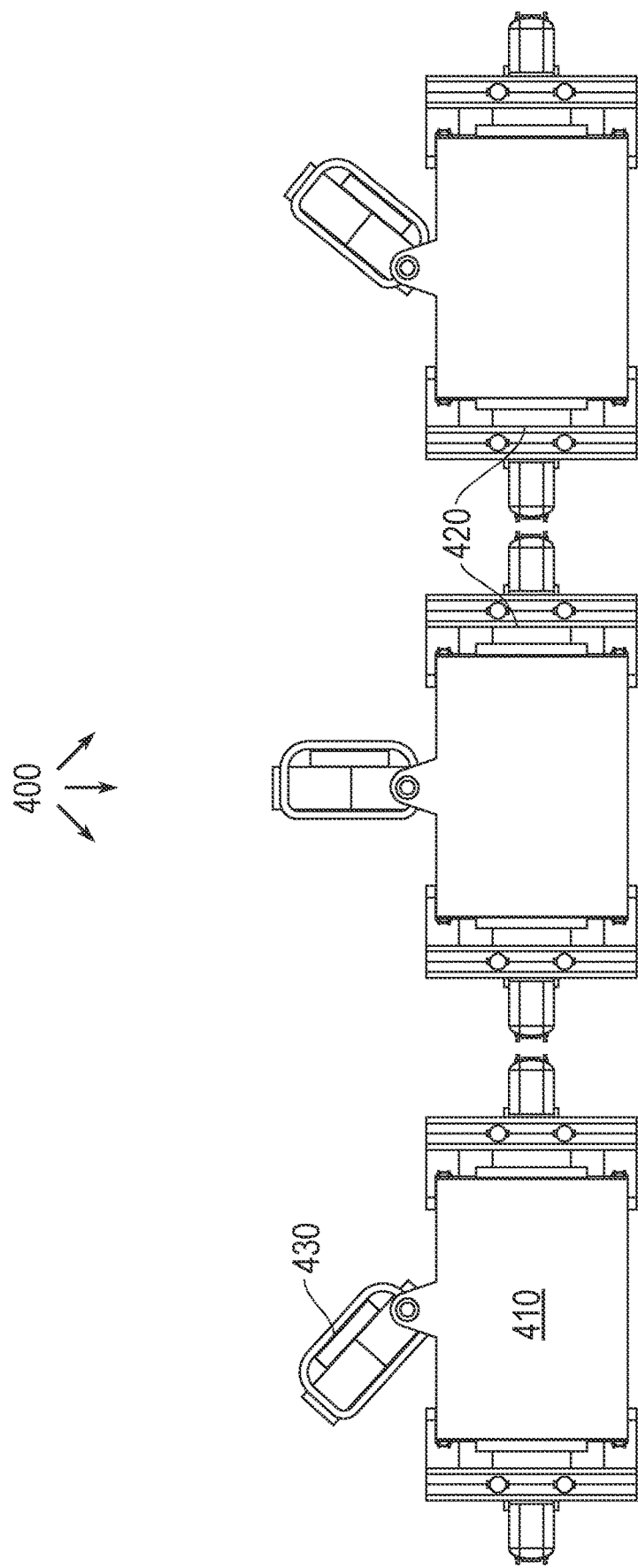
FIGS. 4A-4C are top views of an example magnetic crawler having only three articulated magnetic wheels, illustrating a rotational degree of freedom for the rear wheel in the swivel direction, with the swivel of the rear wheel being to the left, centered, and to the right, respectively, according to an embodiment.

FIG. 2 is a cutaway view of an example magnetic crawler 200 having only three articulated magnetic wheels (including front driving wheels 220 and rear caster wheel 230) for navigating a curved ferromagnetic surface (such as a carbon steel pipe), according to an embodiment. For ease of illustration, and to better explain how the crawler 200 drives and moves, FIG. 2 shows a simplified barebone crawler chassis 210 to better depict the features of the three articulated wheels.

In further detail, the two front wheels 220 (the driving wheels, or right and left drive wheels) are independently motorized by respective driving motors 222. As such, the wheels 220 can be actuated and turned in unison (such as under the control of a controller, as in controller 160) to drive the crawler 200 forward or backward. In some embodiments, the controller is further configured by code to control the actuation of the front driving wheels 220 (through the driving motors 222) in opposing directions in order to perform differential steering and turn the crawler 200 in place. These combined movements provide the controller enough freedom to control the crawler 200 to roam anywhere on the pipe's surface.

To this end, the rear caster wheel 230 provides support to the crawler 200 and is passive (not actuated). The rear wheel 230 has multiple (e.g., two) degrees of freedom in order to allow the rear wheel 230 to roll behind the crawler 200 without sideslip and while maintaining tangential contact with the curved surface while the crawler 200 is moving, regardless of factors such as the direction of motion, pipe diameter, or inclination. To enable such robust maneuverability, in some embodiments, the crawler 200 has four axes of rotation 240: one tilt axis 242 for each front wheel 220 (right and left), and two (rear tilt axis 244 and swivel axis 246) for the rear caster wheel 230. Each of the front wheels 220 is rigidly attached to its motor 222 and an articulated wheel holder 224. Each articulated wheel holder 224 allows for wheel rotation around the holder's axis of rotation (front tilt axes of rotation 242). As such, each of the front wheels 220 can independently conform to (e.g., maintain tangential contact with) the curved surface.

In addition, the rear caster wheel 230 is attached to an inner wheel holder 234 (to provide rotation about the rear tilt axis of rotation 244, as with the front wheels), which is in turn attached to an outer wheel holder 236 (to provide rotation about the swivel axis of rotation 246), which is in turn attached to the crawler chassis 210. The outer holder 236 acts as a simple caster wheel found in office chair wheels, for example, while the inner holder 234 allows for roll (or tilt) angular rotation as well. This two degrees of freedom attachment of the rear caster wheel 230 to the chassis 210 enhances the crawler's overall maneuverability and helical maneuvering on pipes.

FIGS. 3A-3B are front views of an example magnetic crawler 300 having only three articulated magnetic wheels (drive wheels 320 and rear wheel 330) navigating flat 20 and curved 40 surfaces, respectively, and illustrating a rotational degree of freedom for the right and left drive wheels 320 in the tilt direction, according to an embodiment. Here, the curved surface 40 represents a six-inch pipe. In general, the curved surface can be any curved ferromagnetic surface exhibiting a radius of curvature, such as a partial or complete cylinder, sphere, or combination, to name a few. The radius of curvature can also vary over the structure being inspected by the magnetic crawler 300.

In further detail with reference to FIGS. 3A-3B, the degree of freedom shown is formed by revolute joint attachments between the crawler chassis 310 and the articulated front (right and left) wheel holders. Due to the rigid attachment between the holders and the front wheels 320, each of the front wheels 320 tilts and adjusts its angle to hold a perpendicular angle between itself and the surface below (also referred to as tangential contact, as the bottom of the wheel is flush with a flat surface 20 and tangent to the curved surface 40, approximating as close to a linear contact as possible). These front wheel angle adjustments are automatic (passive) due to the freely rotatable wheel holders and the magnetic attraction of the wheel to the ferromagnetic smooth curved surface when driving over the curved surface with the wheels. Put another way, the mechanism is designed to enhance magnetic wheel attachment to the surface. By contrast, without this degree of freedom in the front wheels of the crawler, the front wheels will likely contact the pipe on one point (such as an endpoint in a nontangential contact) instead of as close to a full linear contact as possible.

FIGS. 4A-4C are top views of an example magnetic crawler 400 having only three articulated magnetic wheels, illustrating a rotational degree of freedom for the rear wheel 430 in the swivel direction, with the swivel of the rear wheel 430 being to the left, centered, and to the right, respectively, according to an embodiment. This swivel allows the passive rear wheel 430 to track and stabilize the crawler chassis 410 as driven by the front (right and left) drive wheels 420.

In further detail with reference to FIGS. 4A-4C, the rear caster wheel 430 has a first degree of freedom of rotation in the swivel direction that is important for supporting and balancing the crawler chassis 410. Because of this, the rear wheel 430 acts as a support while it also allows the vehicle (crawler) to steer easily and the wheel 430 rolls behind the crawler 400 passively without any sideslip. In some embodiments, this degree of freedom is formed by a revolute joint that is directly attached to the crawler's chassis 410.

Figure 5:
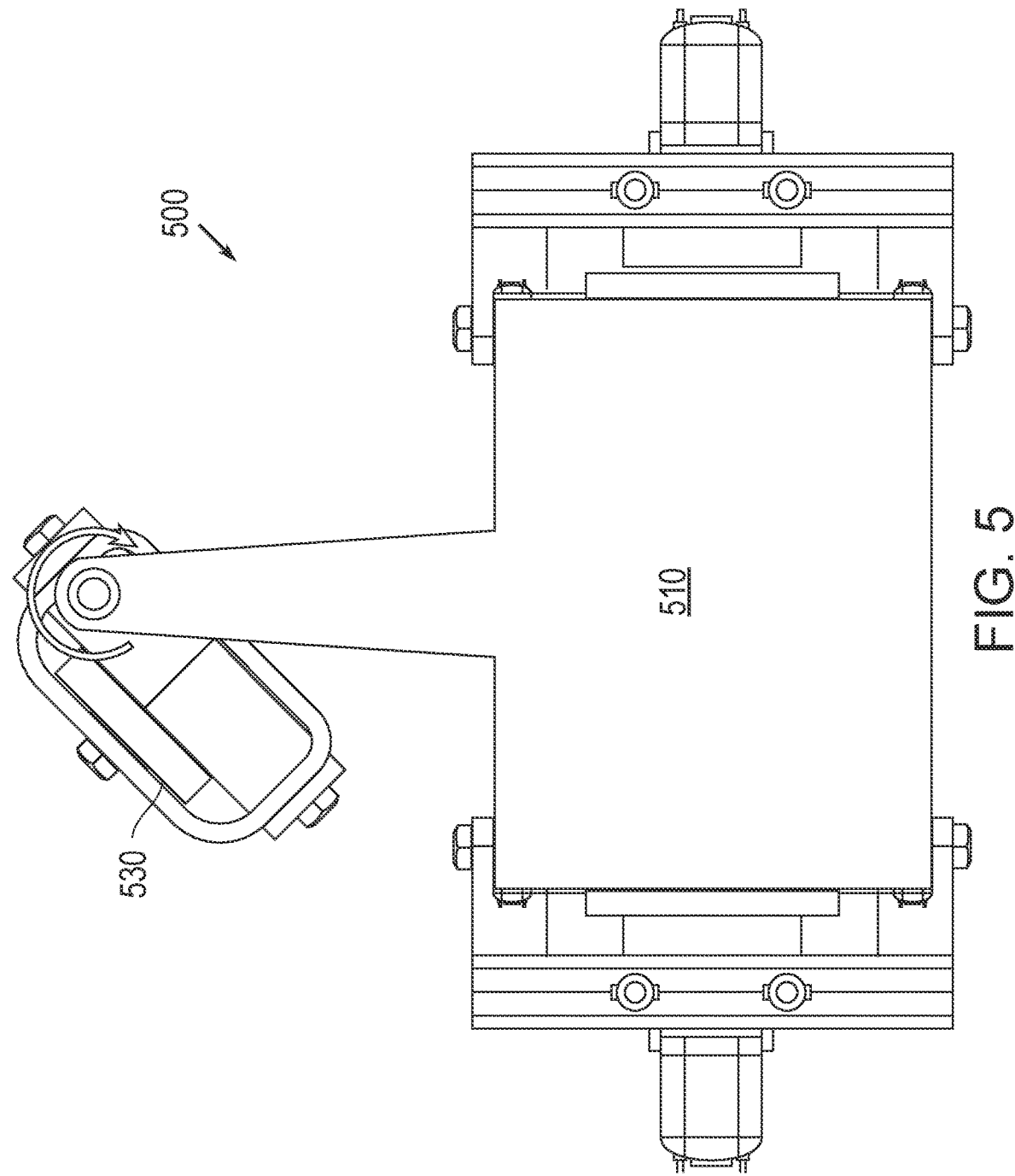
FIG. 5 is a top view of an example magnetic crawler having only three articulated magnetic wheels, illustrating a 360° rotational degree of freedom for the rear wheel in the swivel direction, according to an embodiment.
Figure 6:
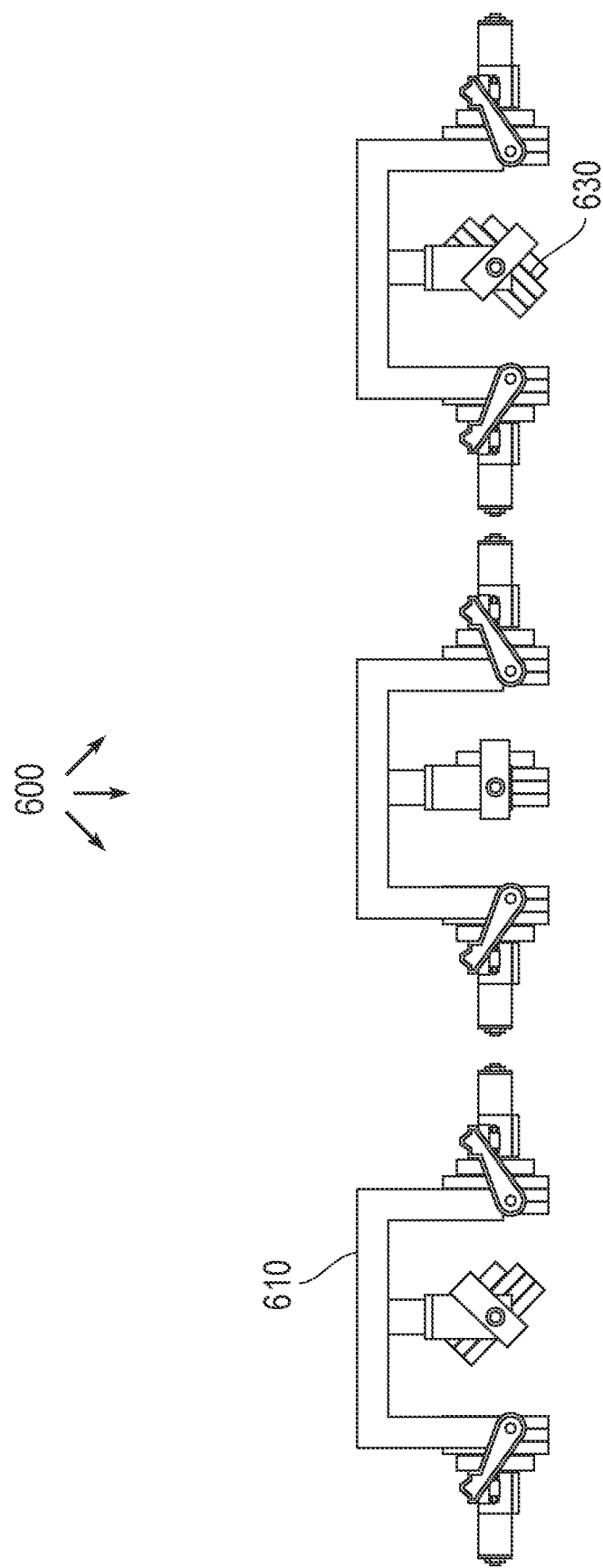
FIGS. 6A-6C are front views of an example magnetic crawler having only three articulated magnetic wheels, illustrating a rotational degree of freedom for the rear wheel in the tilt direction, with the tilt of the rear wheel being to the left, centered, and to the right, respectively, according to an embodiment.

FIG. 5 is a top view of an example magnetic crawler 500 having only three articulated magnetic wheels, illustrating a 360° rotational degree of freedom for the rear wheel 530 in the swivel direction, according to an embodiment. Here, the swivel attachment for the rear wheel 530 extends sufficiently far away from rest of the crawler chassis 510 that the rear wheel 530 can swivel a full 360° in the clockwise and counterclockwise directions.

In further detail with reference to FIG. 5, the crawler 500 is a longer version than earlier embodiments in order to accommodate the longer attachment and corresponding 360° swivel of the rear wheel 530 with respect to the chassis 510. This feature permits an additional capability of the crawler's drivetrain system, namely going in reverse. This feature is added by creating enough space to the backside of the crawler 500 that allows the caster wheel 530 to rotate 360 degrees. As such, the crawler 500 can drive forwards and backwards without any sideslip.

FIGS. 6A-6C are front views of an example magnetic crawler 600 having only three articulated magnetic wheels, illustrating a rotational degree of freedom for the rear wheel 630 in the tilt direction, with the tilt of the rear wheel 630 being to the left, centered, and to the right, respectively, according to an embodiment.

In further detail with reference to FIGS. 6A-6C, in some embodiments, the rear wheel's second degree of freedom is formed by a revolute joint attachment between the outer and inner rear wheel holders. As such, the second degree of freedom (tilt) is independent from the first degree of freedom (swivel) that is connected to the crawler's chassis 610. This joint allows for helical vehicle movement with proper wheel to pipe contact. In addition, because this joint allows for free and passive rotation, the proper wheel-to-pipe contact holds for practically all available pipe sizes (such as all pipes with a diameter of at least six inches).

Figure 7:
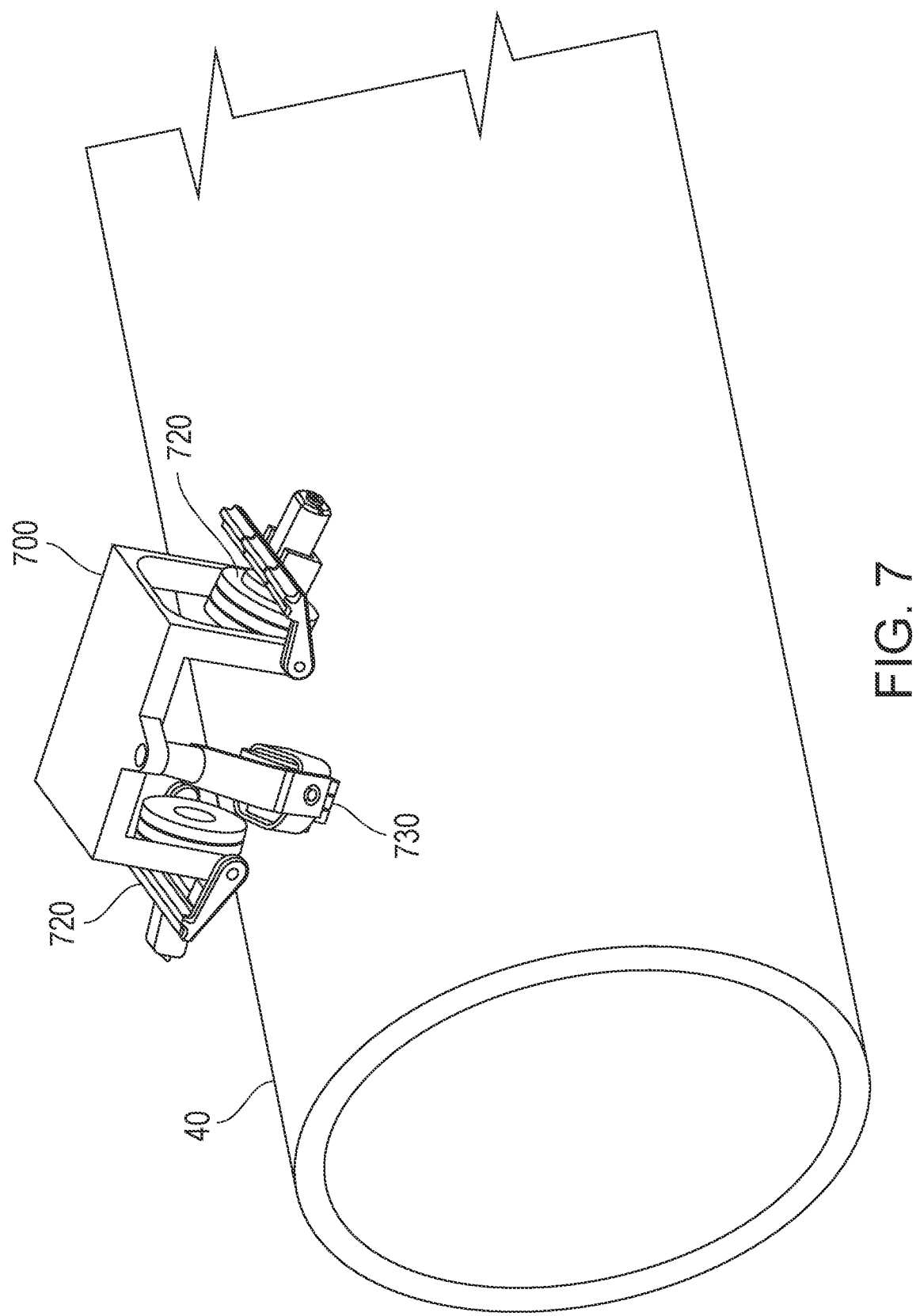
FIG. 7 illustrates an example magnetic crawler having only three articulated magnetic wheels navigating on a ferromagnetic cylindrical surface (in this instance, a pipe), according to an embodiment.

FIG. 7 illustrates an example magnetic crawler 700 having only three articulated magnetic wheels (including two drive wheels 720 and a rear wheel 730) navigating on a ferromagnetic cylindrical surface (in this instance, a pipe 40), according to an embodiment. The crawler 700 is traversing the pipe 40 in a helical path (e.g., transverse to both the longitudinal and circumferential directions).

In further detail with reference to FIG. 7, the magnetic crawler 700 illustrated here is a simplified (barebone) three-wheel crawler 700 on top of a six-inch pipe 40. The crawler 700 is driving in a helical path. This helical path activates all four revolute joints on the front 720 and rear 730 wheels. The helical path tilts each wheel 720 and 730 around its aforementioned (tilt) axes of rotation to allow for proper wheel to pipe contact on this complex path while also swiveling the rear wheel 730 about its swivel axis of rotation to allow the rear wheel 730 to properly track the rest of the crawler 700.

FIGS. 8A-8B are rear views of an example magnetic crawler 800 having only three articulated magnetic wheels (including two drive wheels 820 and a rear wheel 830) navigating on a pipe 40, respectively illustrating the rear wheel 830 prior to and after making tangential contact with the pipe surface, according to an embodiment.

In further detail with reference to FIGS. 8A-8B, the magnetic crawler 800 is maneuvering in a helical path on a six-inch pipe 40. FIG. 8A illustrates the rear wheel's second degree of freedom prior to tilting the rear wheel 830 (and making only a point of contact 831 with the pipe 40). That is, the caster wheel 830 contacts the pipe 40 at a single point 831 (e.g., an endpoint of the bottom of the wheel 830). This reduces magnetic adhesion and can scratch the pipe's outer surface. By contrast, FIG. 8B illustrates the rear wheel's second degree of freedom after tilting the rear wheel 830 (and making a line of contact 833 or tangential contact in as close to a line as possible). As such, there is a proper line of contact 833 between the caster wheel 830 and the pipe 40. Moreover, this line of contact 833 maximizes the magnetic force between the rear wheel 830 and the pipe surface. This is also true for the two front articulated (drive) wheels 820.

In some embodiments, another important feature utilized from the four degrees of freedom is through measurement of the angles of these degrees of freedoms. As already noted, the degrees of freedom provide the magnetic crawler with the ability to maneuver in various configurations or trajectories such as circumferentially, helically, and longitudinally on the curved surfaces. To keep the crawler on a desired trajectory, in some embodiments, the measured angle feedback from the degrees of freedom are input to a controller (such as controller 160), which is configured by code to provide the necessary correction feedback to the drive motors to keep the crawler on the desired trajectory. The angle feedback can be sensed, for example, using a potentiometer, encoder, or any other form of angle measuring sensor from these joints.

FIGS. 9A-9C are top views of an example magnetic crawler 900 having only three articulated magnetic wheels, illustrating example angle measurements of the swivel 939 of the rear wheel 930 with respect to the crawler chassis 910 compared to a centered orientation, with the swivel 939 of the rear wheel 930 being to the left, centered, and to the right, respectively, according to an embodiment. Since the rear wheel 930 tracks the crawler chassis 910, the amount of swivel 939 of the rear wheel 930 represents the degree to which the crawler 900 is deviating from a straight path (relative to the surface on which the crawler 900 is moving).

In further detail with reference to FIGS. 9A-9C, the swivel 939 represents the angle of the caster wheel 930 that needs to be corrected through feedback to keep the crawler 900 going in a straight line. If the caster wheel 930 deviates from the center line (e.g., FIGS. 9A and 9C, having a nonzero swivel), the correction angle 939 (that is, the angle between the dashed and solid reference lines) is input to the controller, which is programmed to command the drive motors to adjust accordingly in order to maintain the caster wheel 930 in a straight configuration (e.g., FIG. 9B).

FIGS. 10A-10B are front views of an example magnetic crawler 1000 having only three articulated magnetic wheels (including two drive wheels 1020 and a rear wheel 1030), illustrating example angle measurements of the tilt 1027 of the right and left drive wheels 1020 with respect to the crawler chassis 1010 on curved 40 and flat 20 surfaces, respectively, compared to a reference direction, according to an embodiment. Here, the tilt 1027 is measured by a component whose orientation varies directly with the tilt (in this case, a wheel holder 1024, as indicated with the solid line) with reference to the crawler chassis 1010 (as indicated with a vertical or dashed line).

In further detail with reference to FIGS. 10A-10B, FIG. 10A illustrates the crawler 1000 traversing the curved surface (or pipe) 40 longitudinally along the length of the pipe 40 (on top of the pipe 40 in this example). When the crawler 1000 is traveling longitudinally along the top of the pipe, the crawler 1000 maintains (or more specifically, the controller is programmed to use the measured angles to drive the wheel motors to maintain) the same tilt (but with opposite directions) for the two drive wheels 1020 together with no tilt or swivel for the rear wheel 1030. If the crawler 1000 starts to drift right or left, the tilt angles will be different, and the controller is further programmed to use this feedback to control the drive motors to steer and correct the crawler's course (through the drive wheels 1020) to keep the crawler 1000 in a straight line on top of the pipe 40. FIG. 10B illustrates how the controller can be programmed to determine when the crawler 1000 is on a flat surface 20, as there will be no measured tilt or swivel in the wheels as the crawler 1000 moves about in a straight direction.

FIG. 11A illustrates an example magnetic crawler 1100 having only three articulated magnetic wheels navigating a helical path on a pipe 40, according to an embodiment. FIG. 11B is an enlarged rear view of the magnetic crawler 1100 of FIG. 11A, illustrating the passive adjustment of the rear wheel 1130 in the tilt direction to track the curved surface of the pipe 40 on the helical path.

In further detail with reference to FIGS. 11A-11B, the crawler 1100 is traversing the surface of the pipe 40 in a helical manner. Here, the measured angles of the articulation joints are input to the controller. The controller is programmed or otherwise configured (e.g., by code or logic) to detect any deviations in the measured angles and those that would be expected with the desired helix pitch. The controller is further programmed or otherwise configured to use any such measured deviations to adjust the driving of the drive wheels in order to return the crawler 1100 to the desired helix pitch of the traversal and ensure proper accurate trajectory following along the desired helix.

The crawler 1100 traversing on a helical path illustrates the importance of the four degrees of freedom for the three articulated magnetic wheels. When the crawler 1100 begins a helical path on the pipe 40, the second degree of freedom (tilt) in the caster wheel 1130 rotates due to its passive self-adjustment design. The adjusted rotation angle 1135 is illustrated in FIG. 11B. This angle 1135 varies for different helical trajectories depending on factors such as the helix pitch. The controller is further configured to use feedback from this joint (such as angle measurement feedback) to ensure that the crawler 1100 is going on the desired helical path without significant deviations and to control the driving of the drive wheels in order to correct or compensate for any noticeable deviations that are detected.

The controller (such as controller 160) is programmed or otherwise configured to control aspects of the magnetic crawler. In example embodiments, the controller is programmed to control the drive motors to independently power the two magnetic drive wheels in order to maneuver the magnetic crawler over ferromagnetic curved surfaces. In some such embodiments, the controller is programmed to control a probe on the crawler to inspect the surface while maneuvering over the surface. In some embodiments, the controller is programmed to use angle measurement feedback from each of the four revolute joints as feedback in order to adjust the driving of the crawler so that it reaches or maintains the desired trajectory on the curved surface.

In some embodiments, the controller is programmed to combine a mathematical model of the crawler based on its geometry (e.g., location of axes of rotation) and angular data from the revolute joints into an accurate estimation of the pose of the crawler and its orientation with respect to the pipe. In some such embodiments, the controller is further configured to use this pose estimation to maintain the crawler on the desired trajectory. In some such embodiments, the controller is further programmed to increase the accuracy of this pose estimation and course trajectory maintenance by fusing the pose estimation with further data from, for example, an inertial measurement unit (IMU), a satellite navigation device (e.g., GPS), or known geometry of the surroundings (such as the pipe diameter being traversed by the crawler).

In some embodiments, the controller is programmed to use the feedback from angular measurements of the joints to better control and track the trajectory of the magnetic crawler. In some such embodiments, the controller is programmed to control the performing of inspection scans of the curved ferromagnetic surface over this trajectory by controlling the probe (such as a UT thickness sensor) to periodically or continuously inspect the surface while correlating this inspection data with the determined location on the surface of the pipe from which the data was obtained. In some such embodiments, the controller is further programmed to enhance the quality of inspection scans through enhancing the correlation between the inspection data and the location on the surface of the pipe being inspected (e.g., through use of better pose estimation, crawler navigation, or angular measurement of revolute joints, to name a few).

In some embodiments, the controller is programmed to control a UT thickness probe attached to the crawler to take thickness measurements of the pipe in a B-scan (or continuous linear) approach, such as longitudinally along the length of the pipe (parallel to the pipe axis) or circumferentially about a circumference of the pipe (equidistant from a point on the pipe axis). In some embodiments, the controller is programmed to control the UT thickness probe to take thickness measurements of the pipe in a C-scan (or complete two-dimensional surface mapping) approach. In some such embodiments, the controller is programmed to perform the C-scan by traversing the pipe in a helical path with a small enough helix pitch to cover the surface of the pipe (e.g., to a desired density of UT thickness measurement locations to effectively produce a map of the surface thickness of the entire pipe's two-dimensional surface region).

In some embodiments, the described locomotion system (e.g., three articulated magnetic wheels, with two active wheels independently driven and a passive rear wheel, having tilt revolute joints on all three wheels and a swivel revolute joint as well on the rear wheel) allows the magnetic crawler (as controlled by a controller programmed to control the crawler) to drive on convex surfaces such as outer surfaces of pipes, straight pipes, storage tanks, and the like, but also on concave surfaces such as inner surfaces of pipes as well as outer surfaces of elbows (e.g., an elbow or elbow pipe joint that has both convex and concave sections).

With reference to FIGS. 1-11B, in some example embodiments, a magnetic crawler (such as magnetic crawler 100, 200, 300, 400, 500, 600, 700, 800, 900, 1000, or 1100) that navigates on and inspects a ferromagnetic cylindrical surface (such as pipe 40 or a storage tank) is provided. The magnetic crawler includes a chassis (such as crawler chassis 110, 210, 310, 410, 510, 610, 910, or 1010), a controller (such as controller 160) coupled to the chassis, a probe (such as UT probe 150) coupled to the chassis, and only three articulated magnetic wheels coupled to the chassis. The controller (e.g., microprocessor) is configured by code to control the magnetic crawler. The probe inspects the ferromagnetic cylindrical surface under the control of the controller. The three articulated magnetic wheels include two (right and left) driving wheels (such as drive wheels 120, 220, 320, 420, 720, 820, or 1020) and a passive rear wheel (such as rear wheel 130, 230, 330, 430, 530, 630, 730, 830, 930, 1030, or 1130). The magnetic wheels tangentially contact (such as linearly or as close to a line as possible) and magnetically adhere to the cylindrical surface.

The right and left drive wheels are respectively coupled to the chassis by right and left articulation joints (such as wheel holders 224 or 1024). In addition, the right and left drive wheels drive the magnetic crawler in a desired direction (such as longitudinally, circumferentially, or helically) on the cylindrical surface by actively rotating independently about respective right and left drive axes of rotation using respective right and left drive motors (such as driving motors 222) under the control of the controller. The rear wheel is coupled to the chassis by a rear articulation joint (such as inner caster wheel holder 234 and outer caster wheel holder 236). Further, the rear wheel passively rotates about a rear drive axis of rotation in response to the active rotations of the right and left drive wheels.

The right and left articulation joints respectively provide single degree of freedom rotation of the right and left drive wheels with respect to the chassis about respective right and left tilt axes of rotation (such as front tilt axes of rotation 242) in order to tilt the right and left drive wheels with respect to the chassis and maintain the tangential contact with the curvature of the cylindrical surface. The rear articulation joint provides two degrees of freedom rotation of the rear wheel with respect to the chassis about a rear tilt axis of rotation (such as rear tilt axis of rotation 244) and a swivel axis of rotation (such as swivel axis of rotation 246) perpendicular to the rear tilt axis of rotation. The rear tilt axis of rotation tilts the rear wheel with respect to the chassis and maintains the tangential contact with the curvature of the cylindrical surface. The swivel axis of rotation swivels the rear wheel with respect to the chassis in the desired direction in response to the driving of the magnetic crawler.

In an embodiment, the right and left drive wheels actively rotate independently about their respective right and left drive axes of rotation in either forward or reverse directions (to provide for differential steering and turning in place) using their respective right and left drive motors under the control of the controller. In an embodiment, the magnetic crawler further includes angle measuring sensors coupled to the chassis. The angle measuring sensors measure respective angles of the tilts (such as tilt 1027) of the three magnetic wheels with respect to the chassis and measure an angle of the swivel (such as swivel 939) of the rear wheel with respect to the chassis under the control of the controller. In an embodiment, the controller is further configured by code to maintain the magnetic crawler on a desired trajectory on the cylindrical surface by controlling the driving of the right and left drive wheels using the measured angles. In an embodiment, the desired trajectory is a helical path having a desired helix pitch of the cylindrical surface.

In an embodiment, the probe includes an ultrasonic testing (UT) sensor that nondestructively measures a thickness of the cylindrical surface under the control of the controller. In addition, the controller is further configured by code to perform a two-dimensional mapping (such as a C-scan) of the surface thickness across the whole cylindrical surface by controlling the UT sensor to measure the surface thickness while controlling the driving of the right and left drive wheels along the helical path. In an embodiment, the controller is further configured by code to estimate a pose of the magnetic crawler with respect to the cylindrical surface using the measured angles and a geometry of the magnetic crawler. In an embodiment, the rear articulation joint provides the rear wheel with 360° of rotation about the rear swivel axis of rotation. In an embodiment, the cylindrical surface is part of a carbon steel pipe or vessel (such as a storage tank).

The described techniques herein can be implemented using a combination of sensors, cameras, and other devices including computing or other logic circuits configured (e.g., programmed) to carry out their assigned tasks. These devices are located on or in (or otherwise in close proximity to) the chassis of the magnetic crawler for carrying out the techniques. In some example embodiments, the control logic is implemented as computer code configured to be executed on a computing circuit (such as a microprocessor) to perform the control steps that are part of the technique.

Figure 12:
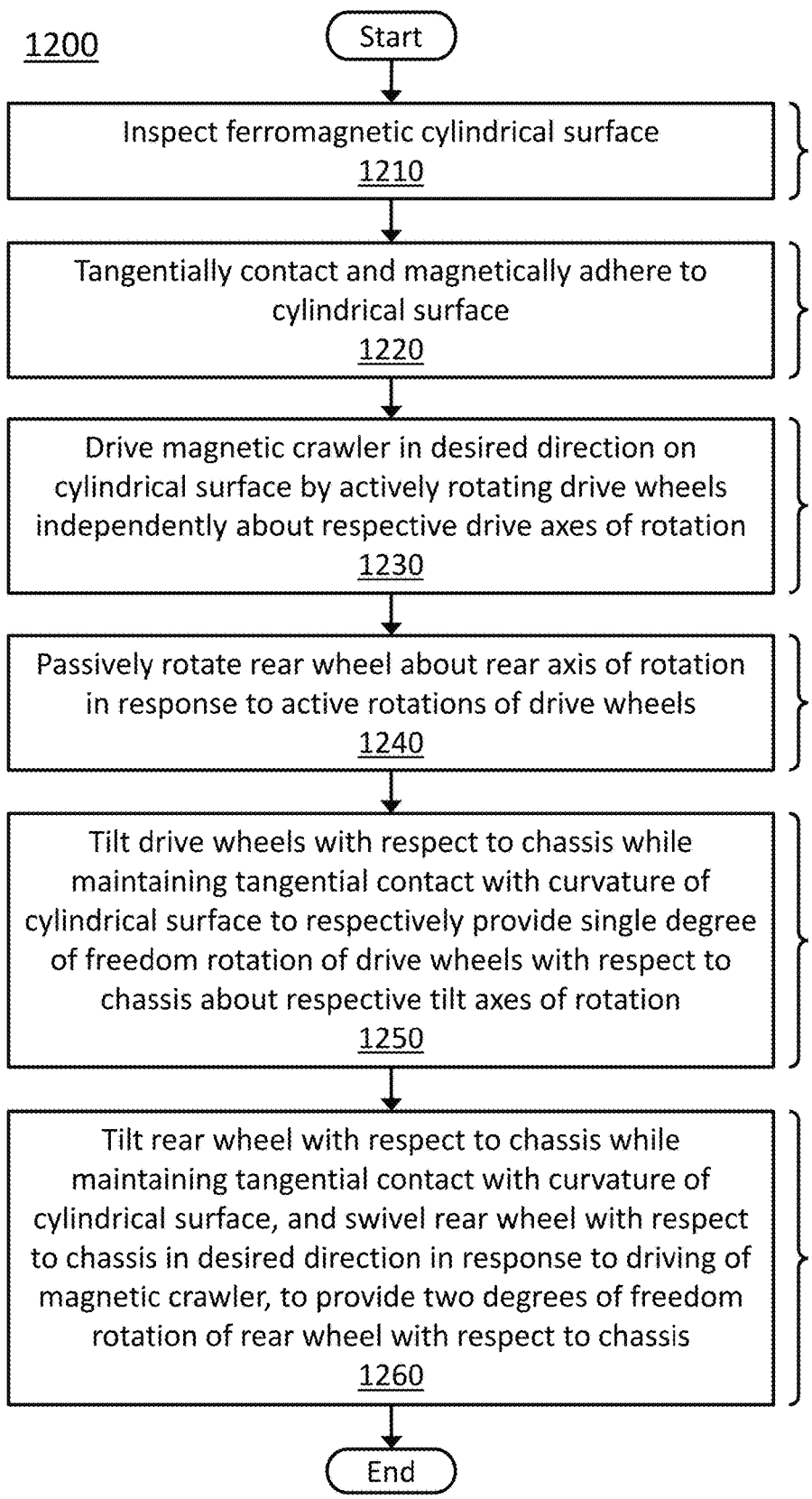
FIG. 12 is a flow diagram of an example automated method of navigating on and inspecting a ferromagnetic cylindrical surface using a magnetic crawler having only three articulated magnetic wheels, according to an embodiment.

FIG. 12 is a flow diagram of an example automated method 1200 of navigating on and inspecting a ferromagnetic cylindrical surface (such as pipe 40) using a magnetic crawler (such as magnetic crawler 100, 200, 300, 400, 500, 600, 700, 800, 900, 1000, or 1100) having only three articulated magnetic wheels, according to an embodiment. The magnetic crawler includes a chassis (such as crawler chassis 110, 210, 310, 410, 510, 610, 910, or 1010), a controller (such as controller 160) coupled to the chassis, a probe (such as UT probe 150) coupled to the chassis, and only three articulated magnetic wheels coupled to the chassis. The method 1200 is partially or wholly automated under the control of the electronic controller, which is configured (e.g., by code, such as programmed) to carry out steps of the method 1200. The three magnetic wheels include right and left drive wheels (such as drive wheels 120, 220, 320, 420, 720, 820, or 1020) respectively coupled to the chassis by right and left articulation joints (such as articulated wheel holders 224 and 1024), and a rear wheel (such as rear wheel 130, 230, 330, 430, 530, 630, 730, 830, 930, 1030, or 1130) coupled to the chassis by a rear articulation joint (such as inner caster wheel holder 234 and outer caster wheel holder 236).

Some or all of the method 1200 can be performed using components and techniques illustrated in FIGS. 1-11B. In addition, portions of this and other methods disclosed herein can be performed on or using an onboard controller, such as a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can also be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 700 (or other disclosed method) to be carried out. It should be noted that in other embodiments, the order of the operations can be varied, and that some of the operations can be omitted. Some of the method 1200 can also be performed using logic, circuits, or processors located on or in electrical communication with a processing circuit configured by code to carry out these portions of the method 1200.

In the method 1200, processing begins with the step of inspecting 1210 the ferromagnetic cylindrical surface (such as performing UT thickness measurements with UT probe 150) by the probe as controlled by the controller. In addition, the method 1200 includes the step of tangentially contacting 1220 (such as linear contact or as close to linear contact as possible) and magnetically adhering to the cylindrical surface by the three articulated magnetic wheels. The method 1200 further includes the step of driving 1230 the magnetic crawler in a desired direction on the cylindrical surface by actively rotating the right and left drive wheels independently about respective right and left drive axes of rotation using respective right and left drive motors (such as driving motors 222) as controlled by the controller. The method 1200 also includes the step of passively rotating 1240 the rear wheel about a rear drive axis of rotation in response to the active rotations of the right and left drive wheels.

In addition, the method 1200 includes the step of tilting 1250 the right and left drive wheels with respect to the chassis while maintaining their tangential contact with the curvature of the cylindrical surface using the respective right and left articulation joints to respectively provide single degree of freedom rotation of the right and left drive wheels with respect to the chassis about respective right and left tilt axes of rotation (such as tilt axes of rotation 242). The method 1200 further includes the step of tilting 1260 the rear wheel with respect to the chassis while maintaining the tangential contact with the curvature of the cylindrical surface and swiveling the rear wheel with respect to the chassis in the desired direction in response to the driving of the magnetic crawler using the rear articulation joint to provide two degrees of freedom rotation of the rear wheel with respect to the chassis about a rear tilt axis of rotation (such as rear tilt axis of rotation 244) and a swivel axis of rotation (such as swivel axis of rotation 246) perpendicular to the rear tilt axis of rotation.

In some embodiments, actively rotating the right and left drive wheels includes actively rotating the right and left drive wheels independently about their respective right and left drive axes of rotation in either forward or reverse directions (such as with differential steering or turning in place) using their respective right and left drive motors as controlled by the controller. In some embodiments, the magnetic crawler further includes angle measuring sensors coupled to the chassis, and the method 1200 further includes the step of using the angle measuring sensors as controlled by the controller to measure respective angles of the tilts (such as tilt 1027) of the three magnetic wheels with respect to the chassis, and to measure an angle of the swivel (such as swivel 939) of the rear wheel with respect to the chassis. In some embodiments, the method 1200 further includes the step of maintaining, by the controller, the magnetic crawler on a desired trajectory on the cylindrical surface by controlling the driving of the right and left drive wheels using the measured angles. In some embodiments, the desired trajectory is a helical path having a desired helix pitch of the cylindrical surface.

In some embodiments, the probe includes an ultrasonic testing (UT) sensor (such as UT probe 150), and the method 1200 further includes the steps of nondestructively measuring a thickness of the cylindrical surface using the UT sensor as controlled by the controller, and performing, by the controller, a two-dimensional mapping of the surface thickness across the whole cylindrical surface by controlling the UT sensor to measure the surface thickness while controlling the driving of the right and left drive wheels along the helical path. In some embodiments, the method 1200 further includes the step of estimating, by the controller, a pose of the magnetic crawler with respect to the cylindrical surface using the measured angles and a geometry of the magnetic crawler. In some embodiments, the method 1200 further includes the step of providing the rear wheel, by the rear articulation joint, 360° of rotation about the rear swivel axis of rotation. In some embodiments, the cylindrical surface is part of a carbon steel pipe or vessel (such as a storage tank).

The methods described herein may be performed in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A magnetic crawler configured to navigate on and inspect a ferromagnetic cylindrical surface, the magnetic crawler comprising:
    a chassis;
    a controller coupled to the chassis and configured to control the magnetic crawler;
    a probe coupled to the chassis and configured to inspect the ferromagnetic cylindrical surface under the control of the controller; and
    only three articulated magnetic wheels coupled to the chassis and configured to tangentially contact and magnetically adhere to the cylindrical surface, the three magnetic wheels comprising:
        right and left drive wheels respectively coupled to the chassis by right and left articulation joints and configured to drive the magnetic crawler in a desired direction on the cylindrical surface by actively rotating independently about respective right and left drive axes of rotation using respective right and left drive motors under the control of the controller; and
        a rear wheel coupled to the chassis by a rear articulation joint and configured to passively rotate about a rear drive axis of rotation in response to the active rotations of the right and left drive wheels,
    wherein the right and left articulation joints respectively provide single degree of freedom rotation of the right and left drive wheels with respect to the chassis about respective right and left tilt axes of rotation in order to tilt the right and left drive wheels with respect to the chassis and maintain the tangential contact with the curvature of the cylindrical surface, and
    wherein the rear articulation joint provides two degrees of freedom rotation of the rear wheel with respect to the chassis about a rear tilt axis of rotation and a swivel axis of rotation perpendicular to the rear tilt axis of rotation, the rear tilt axis of rotation being to tilt the rear wheel with respect to the chassis and maintain the tangential contact with the curvature of the cylindrical surface, and the swivel axis of rotation being to swivel the rear wheel with respect to the chassis in the desired direction in response to the driving of the magnetic crawler.

2. The magnetic crawler of claim 1, wherein the right and left drive wheels are further configured to actively rotate independently about the right and left drive wheels' respective right and left drive axes of rotation in either forward or reverse directions using the right and left drive wheels' respective right and left drive motors under the control of the controller.

3. The magnetic crawler of claim 1, further comprising angle measuring sensors coupled to the chassis and configured to measure respective angles of the tilts of the three magnetic wheels with respect to the chassis and to measure an angle of the swivel of the rear wheel with respect to the chassis under the control of the controller.

4. The magnetic crawler of claim 3, wherein the controller is further configured to maintain the magnetic crawler on a desired trajectory on the cylindrical surface by controlling the driving of the right and left drive wheels using the measured angles.

5. The magnetic crawler of claim 4, wherein the desired trajectory is a helical path having a desired helix pitch of the cylindrical surface.

6. The magnetic crawler of claim 5, wherein the probe comprises an ultrasonic testing (UT) sensor configured to nondestructively measure a thickness of the cylindrical surface under the control of the controller, and the controller is further configured to perform a two-dimensional mapping of the surface thickness across the whole cylindrical surface by controlling the UT sensor to measure the surface thickness while controlling the driving of the right and left drive wheels along the helical path.

7. The magnetic crawler of claim 3, wherein the controller is further configured to estimate a pose of the magnetic crawler with respect to the cylindrical surface using the measured angles and a geometry of the magnetic crawler.

8. The magnetic crawler of claim 1, wherein the rear articulation joint is configured to provide the rear wheel 360° of rotation about the rear swivel axis of rotation.

9. The magnetic crawler of claim 1, wherein the probe comprises an ultrasonic testing (UT) sensor configured to nondestructively measure a thickness of the cylindrical surface under the control of the controller.

10. The magnetic crawler of claim 1, wherein the cylindrical surface is part of a carbon steel pipe or vessel.

11. An automated method of navigating on and inspecting a ferromagnetic cylindrical surface using a magnetic crawler comprising a chassis, a controller coupled to the chassis, a probe coupled to the chassis, and only three articulated magnetic wheels coupled to the chassis, the three magnetic wheels comprising right and left drive wheels respectively coupled to the chassis by right and left articulation joints, and a rear wheel coupled to the chassis by a rear articulation joint, the method comprising:
  inspecting the ferromagnetic cylindrical surface by the probe as controlled by the controller;
  tangentially contacting and magnetically adhering to the cylindrical surface by the three articulated magnetic wheels;
  driving the magnetic crawler in a desired direction on the cylindrical surface by actively rotating the right and left drive wheels independently about respective right and left drive axes of rotation using respective right and left drive motors as controlled by the controller;
  passively rotating the rear wheel about a rear drive axis of rotation in response to the active rotations of the right and left drive wheels;
  tilting the right and left drive wheels with respect to the chassis while maintaining the right and left drive wheels' tangential contact with the curvature of the cylindrical surface using the respective right and left articulation joints to respectively provide single degree of freedom rotation of the right and left drive wheels with respect to the chassis about respective right and left tilt axes of rotation; and
  tilting the rear wheel with respect to the chassis while maintaining the tangential contact with the curvature of the cylindrical surface and swiveling the rear wheel with respect to the chassis in the desired direction in response to the driving of the magnetic crawler using the rear articulation joint to provide two degrees of freedom rotation of the rear wheel with respect to the chassis about a rear tilt axis of rotation and a swivel axis of rotation perpendicular to the rear tilt axis of rotation.

12. The method of claim 11, wherein actively rotating the right and left drive wheels comprises actively rotating the right and left drive wheels independently about the right and left drive wheels' respective right and left drive axes of rotation in either forward or reverse directions using the right and left drive wheels' respective right and left drive motors as controlled by the controller.

13. The method of claim 11, wherein the magnetic crawler further comprises angle measuring sensors coupled to the chassis, and the method further comprises using the angle measuring sensors as controlled by the controller to measure respective angles of the tilts of the three magnetic wheels with respect to the chassis, and to measure an angle of the swivel of the rear wheel with respect to the chassis.

14. The method of claim 13, further comprising maintaining, by the controller, the magnetic crawler on a desired trajectory on the cylindrical surface by controlling the driving of the right and left drive wheels using the measured angles.

15. The method of claim 14, wherein the desired trajectory is a helical path having a desired helix pitch of the cylindrical surface.

16. The method of claim 15, wherein the probe comprises an ultrasonic testing (UT) sensor, and the method further comprises nondestructively measuring a thickness of the cylindrical surface using the UT sensor as controlled by the controller, and performing, by the controller, a two-dimensional mapping of the surface thickness across the whole cylindrical surface by controlling the UT sensor to measure the surface thickness while controlling the driving of the right and left drive wheels along the helical path.

17. The method of claim 13, further comprising estimating, by the controller, a pose of the magnetic crawler with respect to the cylindrical surface using the measured angles and a geometry of the magnetic crawler.

18. The method of claim 11, further comprising providing the rear wheel, by the rear articulation joint, 360° of rotation about the rear swivel axis of rotation.

19. The method of claim 11, wherein the probe comprises an ultrasonic testing (UT) sensor, and the method further comprises nondestructively measuring a thickness of the cylindrical surface using the UT sensor as controlled by the controller.

20. The method of claim 11, wherein the cylindrical surface is part of a carbon steel pipe or vessel.

* * * * *